United States Patent
Tashiro et al.

(10) Patent No.: US 9,384,426 B2
(45) Date of Patent: Jul. 5, 2016

(54) IMAGE FORMING APPARATUS AND IMAGE FORMATION METHOD THAT REFLECTS SETUP INFORMATION EITHER OF MOBILE TERMINAL OR OPERATION PANEL

(71) Applicant: KYOCERA Document Solutions Inc., Osaka (JP)

(72) Inventors: Michiko Tashiro, Osaka (JP); Keiko Morita, Osaka (JP); Kenta Toyamasaki, Osaka (JP); Takushi Dandoko, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/717,846

(22) Filed: May 20, 2015

(65) Prior Publication Data

US 2015/0339544 A1 Nov. 26, 2015

(30) Foreign Application Priority Data

May 20, 2014 (JP) .................................. 2014-103965

(51) Int. Cl.
| | |
|---|---|
| G06K 15/00 | (2006.01) |
| G06F 3/12 | (2006.01) |
| B41J 29/00 | (2006.01) |
| B41J 29/38 | (2006.01) |
| H04N 1/00 | (2006.01) |

(52) U.S. Cl.
CPC ............... *G06K 15/007* (2013.01); *B41J 29/00* (2013.01); *B41J 29/38* (2013.01); *G06F 3/12* (2013.01); *G06F 3/1253* (2013.01); *G06F 3/1292* (2013.01); *H04N 1/00* (2013.01)

(58) Field of Classification Search
USPC ......................................................... 358/1.15
See application file for complete search history.

(56) References Cited

U.S. PATENT DOCUMENTS

| | | | |
|---|---|---|---|
| 2014/0155121 A1* | 6/2014 | Haba .................. | H04N 1/00129 455/557 |
| 2014/0185090 A1* | 7/2014 | Ohata .................. | G06K 15/002 358/1.15 |
| 2014/0320918 A1* | 10/2014 | Yamamoto ............ | G06F 3/1292 358/1.15 |
| 2014/0340706 A1* | 11/2014 | Kondo .................. | G06F 3/1292 358/1.15 |

FOREIGN PATENT DOCUMENTS

JP 2001-293937 A 10/2001

* cited by examiner

*Primary Examiner* — Ngon Nguyen
(74) *Attorney, Agent, or Firm* — Hawaii Patent Services; Nathaniel K. Fedde; Kenton N. Fedde

(57) ABSTRACT

Provided is an image forming apparatus that reflects setup information according to an intention of a user. The image forming apparatus is operational from each of a mobile terminal and an operation panel. Accordingly, the image forming apparatus has an operation determination processing part. The operation determination part, when the start key in the operation panel is pressed, determines to reflect either of setup information of the mobile terminal or setup information of an operation panel.

11 Claims, 3 Drawing Sheets

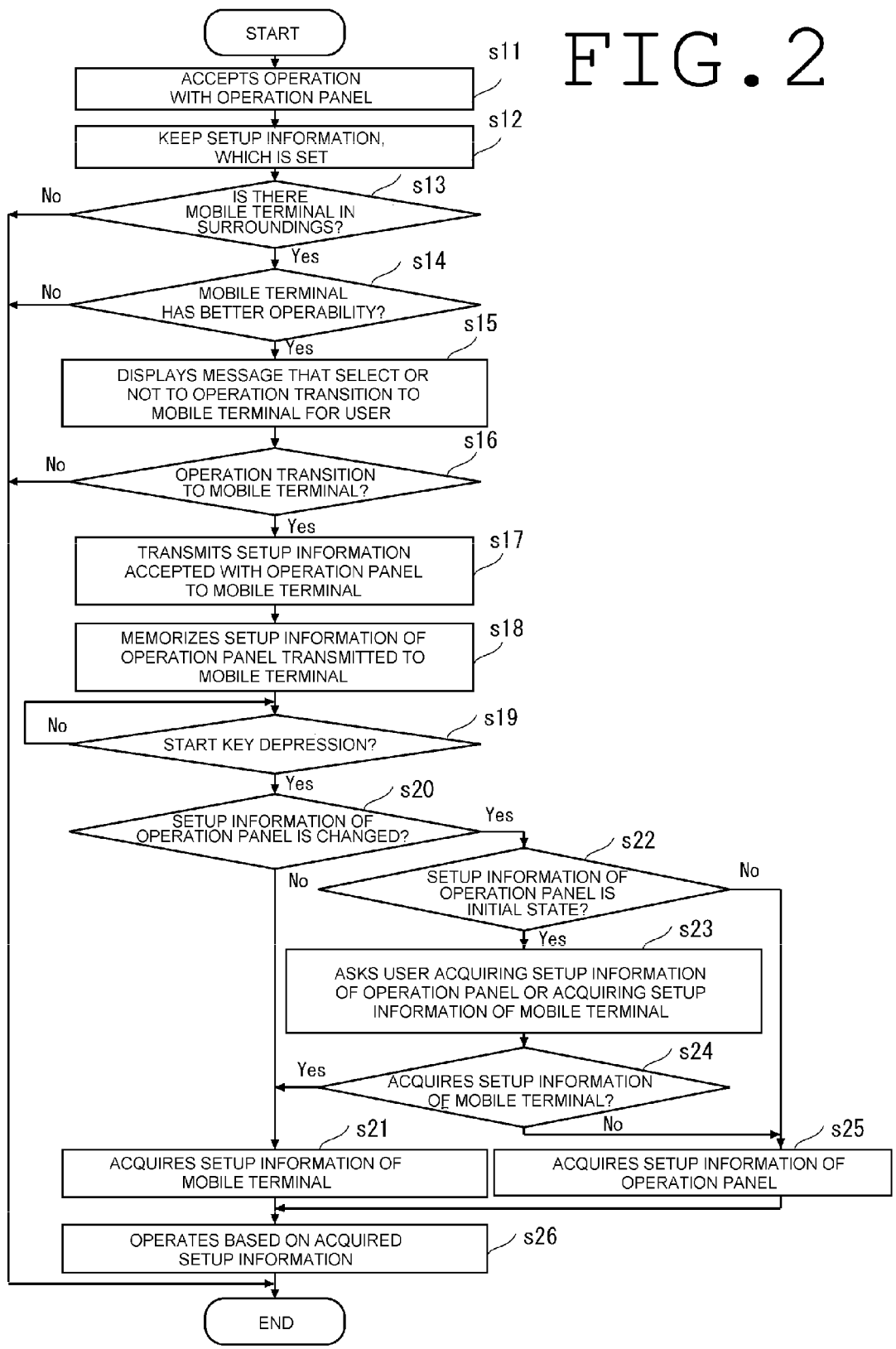

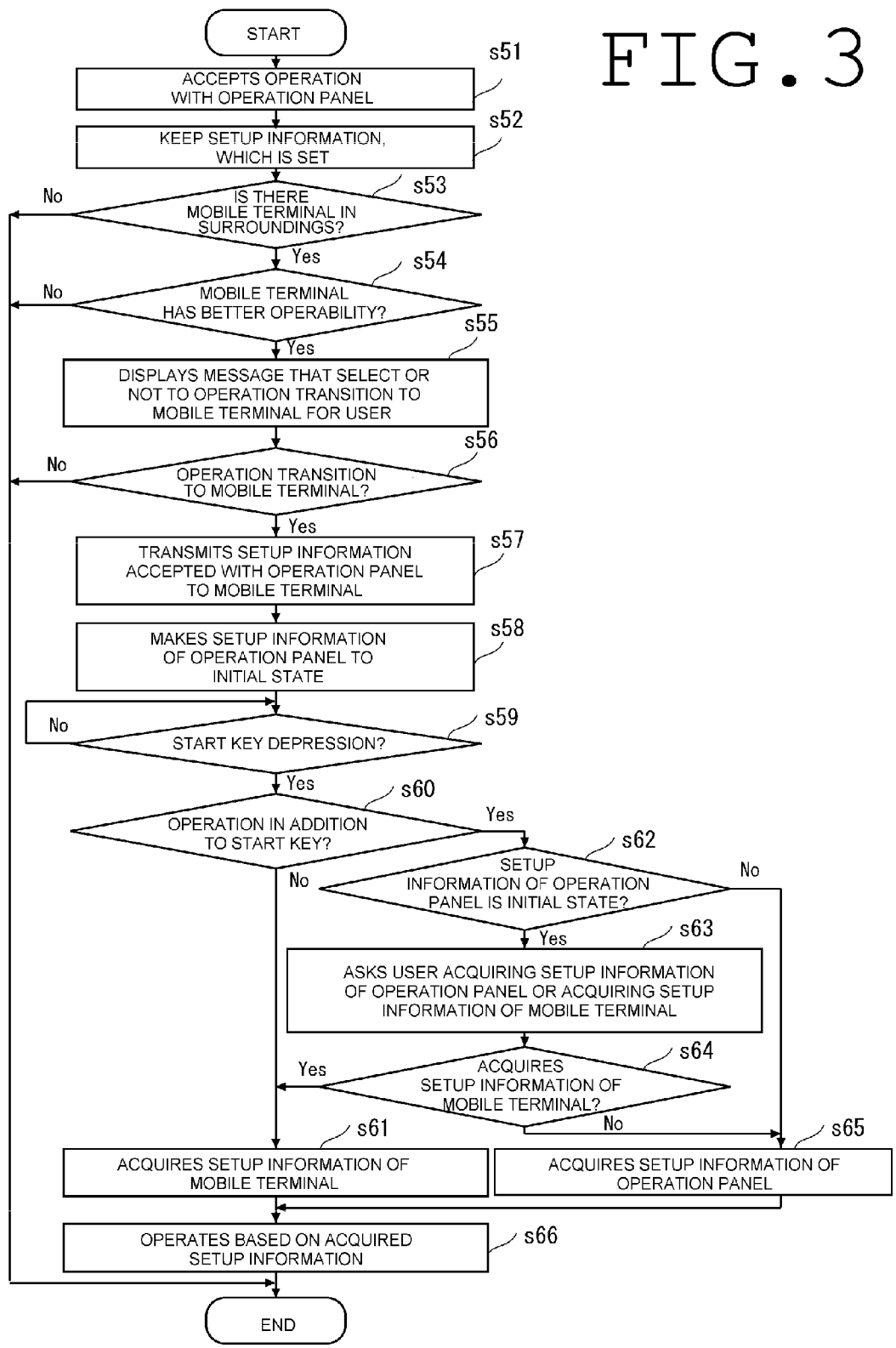

IMAGE FORMING APPARATUS AND IMAGE FORMATION METHOD THAT REFLECTS SETUP INFORMATION EITHER OF MOBILE TERMINAL OR OPERATION PANEL

INCORPORATION BY REFERENCE

This application is based on and claims the benefit of priority from Japanese Patent Application No. 2014-103965 filed on May 20, 2014, the contents of which are hereby incorporated by reference.

BACKGROUND

The present disclosure is related with an image forming apparatus and image formation method that is operational from each of a mobile terminal and an operation panel.

Some typical image forming apparatuses are operational from each of an operation panel and a mobile terminal, and it can change setup information, such as a print setting, for each job. Usually, when the operation key (for example, start key) that instructs an execution start of a job with the operation panel is pressed, the job is performed based on the setup information set up with the operation panel. Also, when the operation key (for example, execution keys) that instructs an execution of the job with the mobile terminal is pressed, the setup information set up with the mobile terminal is transmitted to the image forming apparatus, and the job is performed based on the transmitted setup information. Among these, a case, which changes the setup information with an operation panel, reflects the changed setup information on the print data received from the external terminal, and prints, is also known.

SUMMARY

The present disclosure is an image forming apparatus that is operational from each of a mobile terminal and an operation panel. Also, the image forming apparatus has an operation determination processing part. The operation determination processing part determines to reflect, when a start key in the operation panel is pressed, based on an operation states of the operation panel, either setup information set up with the mobile terminal or setup information set up with the operation panel. Also, the present disclosure is an image formation method performed by an image forming apparatus including an operation panel and is operational from a mobile terminal or the operation panel. In the present image formation method, to press a start key in the operation panel is detected. Then, when detected, based on an operation states of the operation panel, either setup information set up with the mobile terminal or setup information set up with the operation panel is determined to reflect.

BRIEF DESCRIPTION OF THE DRAWINGS

FIG. 2 is a flow chart that illustrates a process flow of the operation transition part and an operation determination processing part illustrated in FIG. 1; and FIG. 3 is another flow chart that illustrate a process flow of the operation transition part and an operation determination processing part illustrated in FIG. 1.

DETAILED DESCRIPTION

Figure 1:
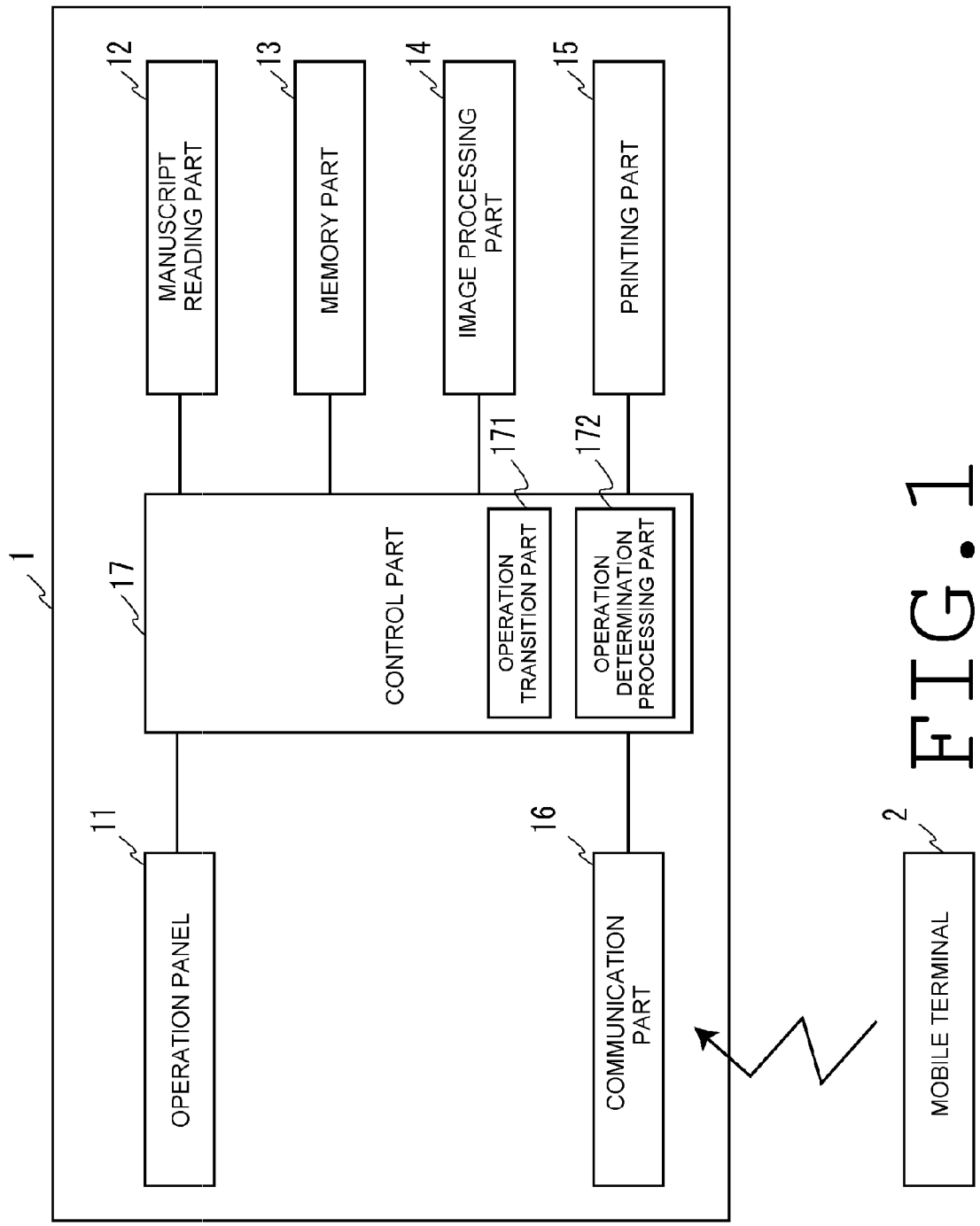
FIG. 1 is a block diagram that illustrating a configuration of an image forming apparatus of the embodiment related to the present disclosure.

Hereinafter, with reference to figures, an embodiment of the present disclosure is described in detail. In following embodiments, the same numerals are given to a component that shows a similar function.

As illustrated in FIG. 1, image forming apparatus 1 includes operation panel 11, manuscript reading part 12, memory part 13, image processing part 14, printing part 15, communication part 16, and control part 17.

Operation panel 11 includes a touch panel and a manual operation button. The touch panel includes a display part and a transparent touch sensor. The display part displays various kinds of operation keys and a situation of image formation. Thereby, the touch panel functions as the display part and an input part. The touch panel detects touch operation to a display surface and outputs a signal corresponding to a position where the touch operation is detected. Thereby, the touch panel accepts an operation to the operation key displayed on the display part. Also, the manual operation button includes various physical operation keys, such as a numeric keypad, a reset key, a stop key, and a start key. The numeric keypad inputs numerical values, such as printing number of sheets. The reset key inputs an instruction that initializes setup information. The stop key stops copying operation. The start key inputs an instruction that starts an operation based on setup information.

Manuscript reading part 12 is a scanner that irradiates light to a manuscript, receives the reflected light, and reads an image of the manuscript. The manuscript may be fed by a manuscript sheet feeding device that is not shown. Also, the manuscript may be placed on platen glass by a user.

Memory part 13 is a non-transitory recording medium. As for memory part 13, image data or the like are stored. The image data has been read by manuscript reading part 12. Also, image data has been received by communication part 16 and memorized.

Image processing part 14 performs specified image processing to the image data. Image processing part 14 performs a scaling process and an image improvement process, for example. The image improvement process is a process of density control, gradation adjustment, or the like.

Printing part 15 prints the image data memorized in memory part 13. Printing part 15 forms a latent image on a surface of a photo conductor drum based on the image data read from memory part 13, for example. Also, printing part 15 performs image formation that makes the latent image to a toner image with toner. Also, printing part 15 makes a recording paper transfer a toner image from the photo conductor drum. Also, printing part 15 fixes the toner image to the recording paper and discharges it.

Communication part 16 has a function that transmits and receives various data with mobile terminal 2. Mobile terminal 2 is an operational terminal for image forming apparatus 1 via a wireless network. In addition, communication part 16 may have a function that transmits and receives various data with an external terminal, such as a personal computer, via a LAN (Local Area Network) cable.

Control part 17 is connected to operation panel 11, manuscript reading part 12, memory part 13, image processing part 14, printing part 15, and communication part 16, respectively. Control part 17 is an information processing part including a non-transitory recording medium. A control program for operation controlling image forming apparatus 1 is memorized in the recording medium. Control part 17 reads the control program memorized in the recording medium. Control part 17 makes the recording medium expand the control program. Thereby, control part 17 controls a whole device. Also, control part 17 functions as operation transition part 171 and operation determination processing part 172. Operation transition part 171 makes operation transition from operation panel 11 to mobile terminal 2. Operation determination processing part 172, when the start key in operation panel 11 is pressed, determines to reflect either setup information of operation panel 11 or setup information of mobile terminal 2.

With reference to FIG. 2, a process flow of operation transition part 171 and operation determination processing part 172 is explained in detail.

Operation transition part 171 accepts a setting operation of setup information via operation panel 11 (Step s11). Operation transition part 171 keeps the set-up setup information (Step s12). Operation transition part 171 determines whether or not mobile terminal 2 is in surroundings (Step s13). For example, operation transition part 171 transmits a response request to mobile terminal 2, which has been registered in image forming apparatus 1 and is possible operation transition, by wireless communication. Operation transition part 171 may determine that there is mobile terminal 2 in surroundings when it has a response from mobile terminal 2. Operation transition part 171 may determine that there is no mobile terminal 2 in surroundings when it has no response.

When there is no mobile terminal 2 in surroundings (No at Step s13), the present process is ended.

On the other hand, when there is mobile terminal 2 in surroundings (Yes at Step s13), operation transition part 171 acquires panel information of mobile terminal 2. The panel information is information, including color or monochrome or the like, resolution, size of a panel, or the like. Operation transition part 171 determines whether or not setting operation having better operability can be performed by accepting with mobile terminal 2 (Step s14). For example, operation transition part 171, when setting operation of continuation reading, operation of copy previewing, or the like are accepted, may determines whether or not setting operation having better operability can be performed by accepting with mobile terminal 2. When it is determined that setting operation having better operability cannot be performed by accepting with mobile terminal 2 (No at Step s14), operation transition part 171 ends the present process.

On the other hand, when it is determined that setting operation having better operability can be performed by accepting with mobile terminal 2 (Yes at Step s14), operation transition part 171 shows a message on operation panel 11 (Step s15). This message is for making a user select whether or not operation transition to mobile terminal 2.

In the message, if the user selects not operation transition to mobile terminal 2 (No at Step s16), operation transition part 171 ends the present process. In addition, when a user selects not operation transition to mobile terminal 2 (No at Step s16,) when there is no mobile terminal in surroundings (No at Step s13,) or when setting operation having better operability cannot be performed by accepting with mobile terminal 2 (No at Step s14,) the user performs setting operation of setup information with operation panel 11 and presses the start key. In that case, operation transition part 171 can operate image forming apparatus 1 based on the setup information of operation panel 11.

On the other hand, if the user selects operation transition to mobile terminal 2 for the message (Yes at Step s16,) operation transition part 171 transmits the setup information accepted with operation panel 11 to mobile terminal (Step s17).

In the setup information transmitted from image forming apparatus 1 to mobile terminal 2, the setup information set up with operation panel 11 and operating screen information are included. The operating screen information is information on a screen that is finally accepting the setting operation of the setup information. In mobile terminal 2, when setup information is transmitted from image forming apparatus 1, an operation screen is displayed where the transmitted setup information is reflected. Therefore, the user can operate it with mobile terminal 2 from a continuation of the operation that is performed with operation panel 11. Then, setting operation is performed by mobile terminal 2, and confirming operation, such as pressing execution keys with mobile terminal 2, is performed. In that case, the setup information of mobile terminal 2 is transmitted to image forming apparatus 1. Then, image forming apparatus 1 operates based on the transmitted setup information.

In addition, mobile terminal 2 can display the operation screen corresponding to the operation screen of operation panel 11. Also, even after the operation information is transmitted to mobile terminal 2, the setup information of operation panel 11 is kept without being initialized. This is for changing mind of the user and desiring to operate not with mobile terminal 2 but with operation panel 11. In addition, when operation panel 11 is not operated for a specified period, or when image forming apparatus 1 does not perform a job for a specified period, it is auto reset. That is, the setup information of operation panel 11 is initialized.

Operation transition part 171 transmits the setup information of operation panel 11 to mobile terminal 2. In that case, operation determination processing part 172 memorizes the setup information of operation panel 11 transmitted to mobile terminal 2 in memory part 13 (Step s18). Then, operation transition part 171 advances a process to Step s19.

Continuing, operation determination processing part 172 determines whether or not the start key in operation panel 11 is pressed (Step s19). If the start key is not pressed (No at Step s19,) operation determination processing part 172 returns a process to Step s19. If the start key is pressed (Yes at Step s19,) operation determination processing part 172 determines whether or not there is any modification to the setup information of operation panel 11 between the setup information of operation panel 11 memorized in memory part 13 and the setup information of operation panel 11 at the time of start key being pressed (Step s20.)

If there is no modification in the setup information of operation panel 11 (No at Step s20,) operation determination processing part 172 determines that the start key having been pressed by the operator of mobile terminal 2, the setup information of mobile terminal 2 is acquired (Step s21,) and a process is advanced to Step s26. For example, operation determination processing part 172 may transmit send-request of setup information to mobile terminal 2 by wireless and may acquire setup information from mobile terminal 2.

On the other hand, when there is modification to the setup information of operation panel 11 (Yes at Step s20), operation determination processing part 172 determines whether or not the setup information of operation panel 11 is an initial state (Step s22). A case that the setup information of operation panel 11 is in the initial state is a case of being auto reset, pressing the reset key, or the like. The case of being auto reset is a case where operation panel 11 is not operated for a specified period, or image forming apparatus 1 does not perform a job for a specified period. Also, the reset key is in operation panel 11.

If the setup information of operation panel 11 is not the initial state (No at Step s22,) operation determination processing part 172 determines that the start key is pressed by a user other than the operator of mobile terminal 2. Operation determination processing part 172 acquires the setup information of operation panel 11 (Step s25), and advances a process to Step s24. That is, in this case, after operation transition from operation panel 11 to mobile terminal 2, it determined that users other than the operator of mobile terminal 2 operate operation panel 11 and presses the start key.

On the other hand, if the setup information of operation panel 11 is the initial state (Yes at Step s22,) operation determination processing part 172 determines unable to distinguish that the start key is pressed by the operator of mobile terminal 2 or is pressed by a user other than the operator of mobile terminal 2. Then, operation determination processing part 172 shows a message on operation panel 11 (Step s23). This message inquires a user whether or not acquiring the setup information of operation panel 11 or acquiring the setup information of mobile terminal 2. That is, in this case, a case where the setup information of operation panel 11 becomes in the initial state by unintentional auto reset or a case where setup information of operation panel 11 becomes in the intentional initial state, can be considered. This is because these are undistinguishable. The case of being unintentional auto reset is considered a case where the operator of mobile terminal 2 has taken time in setting operation or has been somewhere on the way, and it delays to be pressed the start key. Also, the case of being intentional initial state to setup information of operation panel 11 is considered a case where the user other than the operator of mobile terminal 2 press the reset key in operation panel 11 before pressing the start key.

Continuing, operation determination processing part 172 determines whether or not acquiring the setup information of mobile terminal 2 is selected in the message (Step s24). If acquiring the setup information of mobile terminal 2 is selected (Yes at Step s24,) operation determination processing part 172 acquires the setup information of mobile terminal 2 (Step s21). If not acquiring the setup information of mobile terminal 2 is selected (No at Step s24,) operation determination processing part 172 acquires the setup information of operation panel 11 (Step s25).

Continuing, operation determination processing part 172 operates based on the setup information acquired from operation panel 11 or mobile terminal 2 (Step s26,) and ends the present process.

Thus, in the present embodiment, image forming apparatus 1 is operational from mobile terminal 2 or operation panel 11, respectively. Image forming apparatus 1 has operation determination processing part 172 that determines to reflect, when the start key of operation panel 11 is pressed, based on the operation states of operation panel 11, either the setup information of mobile terminal 2 or the setup information of operation panel 11. Therefore, even if an operator of mobile terminal 2 does not perform confirmation operation with mobile terminal 2 and presses the start key of operation panel 11, image forming apparatus 1 can be operated based on the setup information set up with mobile terminal 2.

The present disclosure is not limited to the embodiment mentioned above, and it cannot be overemphasized that it can change of all sorts in the range that does not deviate from the aim of the present disclosure.

For example, in the above-mentioned embodiment, when the setup information of operation panel 11 is transmitted to mobile terminal 2, the setup information of operation panel 11 is memorized in memory part 13. However, this may be initialized. FIG. 3 is a flow chart that illustrates a process flow of operation determination processing part 172 in the case of making the setup information of operation panel 11 into the initial state after transmitting the setup information of operation panel 11 to mobile terminal 2.

In the flow chart as shown in FIG. 3, it is only differing the processes of Step s58 and Step s60 from the processes of Step s18 and Step s20 in the flow chart as shown in FIG. 2. Other processes of Step s51-57, s59, and s61-66 corresponds to the processes of Step s11-17, s19, and s21-26, in the flow chart illustrated in FIG. 2, respectively.

In the flow chart illustrated in FIG. 3, when the setup information of operation panel 11 is transmitted to mobile terminal 2 (Step s57), operation determination processing part 172 makes the setup information of operation panel 11 the initial state (Step s58). Then, it is determined whether operation determination processing part 172 had (Step s59), when the start key was pressed, and it had key operation in addition to the start key (Step s60). When there is no key operation in addition to the start key (No at Step s60,) operation determination processing part 172 acquires the setup information of mobile terminal 2 (Step s61). When there is key operation in addition to the start key (Yes at step s60,) operation determination processing part 172 determines the setup information of operation panel 11 is in the initial state (Step s62). Operation determination processing part 172, when it is not the initial state (No at Step s62,) the setup information of operation panel 11 is acquired (Step s65). When the setup information of operation panel 11 is the initial state (Yes at Step s62,) operation determination processing part 172 makes the user select either the setup information of mobile terminal 2 is acquired or the setup information of operation panel 11 is acquired (Step s63, 64). Operation determination processing part 172 acquires, according to the selected result, the setup information of mobile terminal 2 or the setup information of operation panel 11 (Step s61, 65). Thus, after transmitting the setup information of operation panel 11 to mobile terminal 2, it is not necessary to memorize the setup information of operation panel 11 in memory part 13.

As mentioned above, when there is the operator of the mobile terminal near the image forming apparatus, the start key in the image forming apparatus instead of the mobile terminal may be pressed. In this case, the setup information of the operation panel is reflected, and thus the setup information of the mobile terminal is not reflected. On the other hand, the user who carries out setting operation with the operation panel may press the start key. Therefore, when the start key of the operation panel is pressed, it cannot be recognized to reflect either the setup information of the operation panel or the setup information of the mobile terminal. According to the present disclosure, in an image forming apparatus operational from each of a mobile terminal and an operation panel, when a start key in an operation panel is pressed, it can determine to reflect either of setup information of the mobile terminal or setup information of the operation panel.

What is claimed is:

1. An image forming apparatus including an operation panel and being operational from a mobile terminal or the operation panel, comprising:
    an information processor and a non-transitory recording medium, wherein the non-transitory recording medium comprise a control program that causes the information processor to determines to reflect, when a start key in the operation panel is pressed, based on an operation state of the operation panel, either setup information set up with the mobile terminal or setup information set up with the operation panel, and
    an operation transition part that allows to proceed operation from the operation panel to the mobile terminal, wherein the control program causes the information processor to
  when the start key is pressed after operation transition from the operation panel to the mobile, determine whether or not the setup information of the operation panel changed after operation transition from the operation panel to the mobile terminal,
  in case of being not changed, reflect setup information set up with the mobile terminal,
  in case of being changed, determine whether or not the setup information of the operation panel is an initial state,
  in case of being not the initial state, reflects setup information set up with the operation panel, and
  in case of being the initial state, make a user select to reflect either the setup information set up with the operation panel or the setup information set up with the mobile terminal.

2. The image forming apparatus according to claim 1, wherein when operation is proceeded from the operation panel to the mobile terminal, the setup information of the operation panel is kept without being initialized.

3. The image forming apparatus of claim 1, wherein the start key is a key that inputs an instruction to start an image forming operation based on the setup information.

4. The image forming apparatus of claim 1, wherein the initial state is an auto reset state or a reset sate imparted by pressing of a reset key.

5. The image forming apparatus of claim 1, wherein the case of being not the initial state is a state is a state comprising setup information modified relative to a previous state, wherein said modified setup information was input using the operation panel and not the mobile device.

6. An image forming apparatus including an operation panel and being operational from a mobile terminal or the operation panel, comprising:
  an information processor and a non-transitory recording medium, wherein the non-transitory recording medium comprises a control program that causes the information processor to determine to reflect, when a start key in the operation panel is pressed, based on an operation state of the operation panel, either setup information set up with the mobile terminal or setup information set up with the operation panel,
  an operation transition part that allows to proceed operation from the operation panel to the mobile terminal, wherein
  when operation proceeds from the operation panel to the mobile terminal, the setup information of the operation panel is initialized, and the control program causes the information processor to
    when the start key is pressed after operation transition from the operation panel to the mobile, determine whether or not having key operation other than the start key,
    in case of having no key operation, reflect the setup information set up with the mobile terminal,
    in case of having key operation, determine whether or not the setup information of the operation panel is an initial state,
    in case of being not the initial state, reflect the setup information set up with the operation panel, and
    in case of being the initial state, make a user select to reflect either the setup information set up with the operation panel or the setup information set up with the mobile terminal.

7. The image forming apparatus of claim 6, wherein the start key is a key that inputs an instruction to start an image forming operation based on the setup information.

8. The image forming apparatus of claim 6, wherein the initial state is an auto reset state or a reset sate imparted by pressing of a reset key.

9. The image forming apparatus of claim 6, wherein the case of being not the initial state is a state is a state comprising setup information modified relative to a previous state, wherein said modified setup information was input using the operation panel and not the mobile device.

10. An image formation method executed by an image forming apparatus including an operation panel, wherein:
  the image forming apparatus is operational from each of a mobile terminal and the operation panel,
  the operation panel can be in a plurality of independently operation states, wherein the plurality of operation states comprises an initial state of setup information and a modified state of the setup information, wherein the initial state is an auto reset state or a reset sate imparted by pressing of a reset key, and wherein the modified state is a state comprising setup information modified relative to a previous state,
  the operation panel comprises a start key that inputs an instruction to an image forming operation based on the setup information; and
  the method comprises the steps of using an information processor to:
    detect press of the start key in the operation panel, and
    determine to reflect, based on the current operation state of the operation panel of the plurality, either setup information set up with the mobile terminal or setup information set up with the operation panel.

11. The image method of claim 10, wherein the start key is a key that inputs an instruction to start an image forming operation based on the setup information.

* * * * *